United States Patent Office 3,284,376
Patented Nov. 8, 1966

3,284,376
FLAME RESISTANT URETHANE POLYMER COMPOSITIONS OF IMPROVED DIMENSIONAL STABILITY CONTAINING A TRIS(POLYHALOPHENYL)BORATE
Joseph J. Pedjac, Mount Pleasant, and Charles T. Pumpelly, Midland, Mich., assignors to The Dow Chemical Company, Midland, Mich., a corporation of Delaware
No Drawing. Filed Dec. 12, 1963, Ser. No. 329,975
10 Claims. (Cl. 260—2.5)

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are organic polymers containing repeated urethane linkages. These polymers can be made by reacting an organic polyisocyanate with an organic compound having a plurality of active hydrogens. By a compound having active hydrogen is meant a compound that gives a positive Zerewitinoff test. Polyurethane resins can be made into foams having excellent strength, durability, low density, light color, uniform cell size, and good heat insulating properties and can be used for many purposes. Unforunately, these foams burn readily when ignited; that is, they support combustion, thus making them unsuitable for certain uses in which fire is a hazard. Accordingly, it is desirable to make polyurethane resin foams which are self-extinguishing so as to eliminate or minimize the hazard of fire. By "self-extingushing" it is meant that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

Many halogen-containing compounds, both inorganic and organic, have a tendency to render foams with which they are admixed self-extinguishing by reducing the time that such foams continue to burn after having been separated from a flame causing their ignition. Unfortunately, these halogen-containing compounds often have an effect of impairing to some extent one or more of the desirable properties of the foams, notably dimensional stability at moderately elevated temperatures, when incorporated therewith in amounts that are required to render the foam non-flammable or self-extinguishing. Cellular bodies affected in this manner are poorly suited for commercial applications.

It is among the objects of the present invention to provide urethane polymer compositions having improved self-extinguishing properties.

A further object of the present invention is to provide self-extinguishing polyurethane resin foam compositions, without sacrifice of important physical characteristics of the foamed product.

A still further object of this invention is the provision of self-extinguishing polyurethane foams of good dimensional stability.

These and other objects are accomplished in accordance with the following detailed description of this invention.

In accordance with the present invention, it has been found that the above objects are accomplished and self-extinguishing urethane polymers are provided without sacrifice of dimensional stability when both certain halogen-containing phenyl borates and certain antimony compounds are present in an intimate mixture in the urethane polymer material.

The halogen-containing phenyl borates which can be employed according to the invention are phenyl borates containing a plurality of halogen atoms. Examples of suitable halogen-containing phenyl borates are tris(pentabromophenyl)borate, tris(2,4,6-tribromophenyl)borate, tris(pentachlorophenylborate), and tris(trichlorophenyl)borate.

The halogen-containing borates can be prepared by reacting boron trichloride with a suitable halogenated phenol following the procedure disclosed in U.S. 3,067,236.

The antimony compounds that coact with the halogenated phenyl borates include antimony oxide, antimonous chloride, antimonous bromide, antimonous iodide, antimonous oxychloride, and antimonous sulfide.

As indicated above, polyurethane resins can be made by reacting an organic polyisocyanate with an organic compound having a plurality of active hydrogens. Representative examples of organic polyisocyanates that can be used to make the resin are 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate, 1,4-cyclohexylene diisocyanate, 1,3-cyclopentylene diisocyanate, and mixtures thereof. Arylene diisocyanates, that is, those in which each of the two isocyanate groups is attached directly to an aromatic ring, are preferred. The compound mentioned above having a plurality of active hydrogens can be a polyhydroxy compound such as glycols, triols, hexols, octols, polyesterpolyols, and polyetherpolyols. A polyesterpolyol can be made by reacting a polybasic acid with an excess of a polyhydric alcohol. If a linear polyesterpolyol is desired, difunctional reactants can conveniently be used, such as phthalic acid or its anhydride with ethylene glycol. A polyetherpolyol can be made by condensing a polyhydroxy compound such as ethylene glycol, glycerol and sucrose with an alkylene oxide such as ethylene oxide, propylene oxide, and 1,2-butylene oxide. Using a mixture of polypropylene oxide-glycerol adducts of the formula:

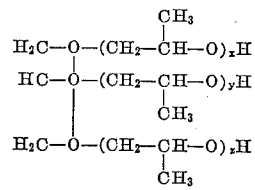

produces a rigid polymer when the sum of $x$, $y$, and $z$ is about 6 and a flexible polymer when the sum of $x$, $y$, and $z$ is about 15 or higher. Relatively low molecular weight alkylene oxide-sucrose condensates produce rigid polymers when polymerized with polyisocyanates. Polymers of varying rigidity and flexibility can be tailored by selecting a condensate or a mixture of condensates of suitable molecular weight and structure to be reacted with the polyisocyanate. Other hydroxyl-rich compounds such as a condensate of ethylene-diamine with propylene oxide can be used to produce useful polyurethanes. By still another approach, polyurethanes can be made by reacting a bischloroformate with a polyamine. In all instances, the resulting polymers contain multiple urethane linkages.

Polyurethane resins can be made in cellular form by adding water or a carboxyl group-containing compound to a reaction mixture containing polyisocyanates, whereby carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Representative examples of suitable volatile liquids which can be used for this purpose are trichloromonofluoromethane, hexane, methylchloroform, symmetrical tetrachlorodifluoroethane, and trichlorotrifluoroethane.

A catalyst for the reaction between the isocyanate radical and active hydrogen can be used when making urethane polymers and is usually desirable when a product of cellular form is to be made. Representative examples of suitable catalysts are triethylenediamine, dibutyltin dilaurate, triethylamine, N,N-dimethylcyclohexylamine, cobalt naphthenate, and stannous octoate.

If desired, a cell-size control agent can be added to the reaction mixture. Materials such as the siloxane-oxyalkylene copolymers disclosed in U.S. 2,834,748 are examples of useful cell-size control agents that may be used in the practice of this invention.

The halogenated phenyl borates are employed in sufficient amounts to provide from about 3 to about 20 percent halogen in the resultant foam product, preferably from 5 to 10 percent, together with the antimony compounds in amounts of from about 2 to about 5 percent, preferably from 3 to 4 percent based on the weight of the urethane reaction mass.

Self-extinguishing urethane polymer compositions are obtained by employing both the halogenated phenyl borates and the antimony compounds in proportions within these ranges.

The halogenated phenyl borates and the antimony compounds can be incorporated in the resin by any method which gives uniform distribution of the agents throughout the body of the resin and which does not cause or result in appreciable deterioration or decomposition of either of said agents or the resin.

The halogenated phenyl borate and the antimony compounds can be premixed and then added to the isocyanate material or to the active hydrogen-containing material before the said materials are brought together to form the polymer. Alternatively, the flame retardant agents of this invention can be premixed and then blended with the polymer-forming reactants as they are brought together or shortly after they are combined and before the reaction has proceeded to a point where uniform dispersion of the flame retardants with the polymer is no longer practicable. If desired, the flame retardant agents of this invention may be added one at a time to the polymer-forming constituents. To illustrate, one of the agents can be added to the isocyanate material, to the active hydrogen-containing material, to a mixture of these materials as they are brought together or shortly thereafter, and before the reaction of the polymer-forming constituents has proceeded to a point where uniform dispersion of the additive in the polymer is no longer practicable, or at two or more of these places. The other agent can be added at one or more of the above places which may be the same or different from where the first agent is added.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

Self-extinguishing polymer compositions of this invention can be made into useful articles by conventional molding, casting, coating, and laminating techniques. Foams of these compositions can be cast onto a conveyor belt to produce sheets or slabs of self-extinguishing polyurethane foams which may then be cut up into convenient sizes. The self-extinguishing foams made from the compositions of this invention can be cast in molds to make desired shapes or the foams can be cast in place to fill voids in a final article as in the potting of electrical equipment and the strengthening of double-walled members.

The following examples are illustrative of the present invention, but the invention is not limited thereto.

EXAMPLE I

A polyurethane foam was prepared from the following formulation.

| Reactant: | Grams |
|---|---|
| Voranate R-1, an isocyanate adduct of a polyetherpolyol prepared by condensing propylene oxide on glycerol to an average molecular weight of 325 and reacting the resulting polyetherpolyol with an excess of toluene diisocyanate having the following properties (percent excess NCO—27; approx. visc., CRS @ 100° F.—1600) | 53.7 |
| Voranol 600, a polyetherpolyol prepared by reacting 2.5 moles glycerine+1.0 mole sucrose +0.5 mole water) with 1 mole propylene oxide per OH, having the following properties (MW/OH—95; OH No. 600; viscosity, CRS @ 100° F.—4500) | 32.7 |
| Silicone X-520, a siloxane-oxyalkylene block copolymer mixture according to U.S. Patent No. 2,834,748 | 0.254 |
| Stannous octoate | 0.432 |
| Tris(pentabromophenyl)borate | 10.0 |
| $Sb_2O_3$ | 4.0 |

The reactants were thoroughly mixed for about 20 seconds to assure uniform distribution of all constituents, and then poured into a rectangular mold. When the foam had gelled, it was placed in an oven at 70° C. After 30 minutes the foam was removed from the oven and allowed to cool to room temperature. The cellular mass was a white, rigid, fine-celled foam.

A test strip was cut from the foamed product and tested for flammability. The strip was in the shape of a rectangular prism three inches long, ¾ inch wide, and ½ inch thick. The strip was placed in the flame of a microburner and after approximately four seconds, it was removed. Upon removal from the microburner flame, the strip was itself aflame and continued to burn for 1 second from the time it was removed from the microburner flame. After the 1 second had elapsed, the flame on the foamed polymer strip went out; that is, the material no longer sustained a flame and was recorded as having self-extinquishing time of 1 second.

The preparation of flame retardant foams was repeated using the above formulation with the exception that tris (2,4,6-tribromophenyl)borate and tris(pentachlorophenyl)borate were substituted for tris(pentabromophenyl) borate. For comparative purposes, a number of other halogenated compounds which do not fall within the scope of the present invention were substituted for tris (pentabromophenyl)borate in the foam formulation. The physical and self-extinguishing properties of these foams (samples D through N) as well as those of the present invention (samples A through C) are listed in Table I below.

Table I

| Sample | Halogen-containing compound added to foam forumlation | Percent by wt. of formulation | Percent $Sb_2O_3$ in foam | Percent halogen in foam | Self-extinguishing time (seconds) |
|---|---|---|---|---|---|
| A | Tris(pentabromophenyl)borate | 8.76 | 3.51 | 7.14 Br | 1.0 |
| B | Tris(2,4,6-tribromophenyl)borate | 10.04 | 3.4 | 7.45 Br | 2.5 |
| C | Tris(pentachlorophenyl)borate | 16.3 | 3.22 | 11.6 Cl | 3.4 |
| D | Pentabromophenol | 8.76 | 3.51 | 7.17 Br | 1.0 |
| E | 2,4,6-tribromophenol | 8.76 | 3.51 | 6.37 Br | 1.0 |
| F | 2,4,6-tribromoaniline | 10.03 | 3.55 | 7.53 Br | 1.0 |
| G | Hexabromobenzene | 8.77 | 3.51 | 7.64 Br | 1.0 |
| H | Hexachlorocyclohexane | 8.76 | 3.51 | 6.41 Cl | 1.5–2 |
| I | 2,4-dibromoethylbenzene | 12.6 | 3.36 | 7.65 Br | 2.5 |
| J | ar-Tribromoethylbenzene | 7.96 | 3.52 | 5.57 Br | 1.5 |
| K | ar-Tetrabromoethylbenzene | 9.95 | 3.46 | 7.55 Br | 1.0 |
| L | ar-Pentabromoethylbenzene | 8.5 | 3.55 | 6.04 Br | 1.–1.25 |
| M | Tribromodephenylether | 12.6 | 3.36 | 7.43 Br | 1.5 |
| N | Tris(2,3-dibromopropyl)phosphate | 10.0 | 5.0 | nd | nd | nd = not determined.

The foams listed in Table I were next tested for dimensional stability. In this test, test blocks approximately 1¾" x 1¾" x 3" in size were cut from the foam. The volume of the foam block was accurately measured by the volume of water it displaced. The sample was then placed in a humidity chamber maintained at 70° C. and 100% relative humidity. Volume changes were observed over a period of several weeks and are recorded in Table II below. In this table, a plus (+) sign in front of a number designates an increase in the original volume of the foam, while a minus (−) sign indicates a decrease in the original volume of the foam.

Table II
PERCENT VOLUME CHANGE

| Sample | 1 | 2 | 3 | 4 | 5 | 6 | 7 | 8 | 11 | 12 | 13 | 14 | 16 | 17 | 18 | 20 | 21 | 23 | 25 | 27 | 28 |
|---|---|---|---|---|---|---|---|---|---|---|---|---|---|---|---|---|---|---|---|---|---|
| A | | | −1 | | −0.72 | | | 0 | | | | −1.11 | | | | 0 | | | | −0.32 | |
| B | | | −0.63 | | −0.31 | | | 0 | +1.56 | | | | | | 0 | | | | | +1.25 | |
| C | | | −0.37 | | −1.11 | | −1.85 | | | | | −2.96 | | | | −2.22 | | | | −2.22 | |
| D | | | | +19 | | | +15.8 | | +9.5 | +13.7 | | | +4.2 | | | | +2.1 | | +1.05 | | |
| E | | | | +12.4 | | | +2.5 | | +5.8 | | | | | −6.6 | | | −4.9 | | −6.6 | | |
| F | +15.2 | | | | | | +17.8 | | | | | | | | | | | | | +17.0 | |
| G | +7.9 | | | | | +9.2 | | | | | | | | | | | | | | +14.6 | |
| H | | +7.88 | | | | +8.6 | | | | | | | +7.88 | | | +7.1 | | | | | |
| I | +8.96 | | | | +14.7 | | | | | | | | | | | | | | +11.8 | | |
| J | +9.5 | | | | | +14.3 | | | | | | | | | | | | | | +13.3 | |
| K | +8.7 | | | | | +17 | | | | | | | | | | | | | | +10.9 | |
| L | +5.9 | | | | | +8.4 | | | | | | | | | | | | | | +10.1 | |
| M | +7.9 | | | | | +15.1 | | | | | | | | | | | | | | +20.8 | |
| N | | +30.0 | | | +26.0 | | | | | | | | −5.0 | | | | | | −6.0 | | |

The data in Table II show that addition of flame retardant compositions of the present invention (samples A through C) do not adversely affect the dimensional stability of the foamed product, the variation of volume changes being between +1.56% and −2.96% at their maximum points; whereas the volume changes of halogenated compositions which do not fall within the scope of the invention (samples D through N) are substantially higher and generally render the foams unsuitable for commercial application.

What is claimed is:

1. A composition of matter comprising a polyurethane resin containing admixed therewith a tris(polyhalophenyl)borate in which each polyhalophenyl group has from 3 to 5 halogen atoms selected from chlorine and bromine and from about 2 to about 5 percent based on the weight of the resin of an antimony compound selected from the oxide, chloride, bromide, iodide, oxychloride, and sulfide.

2. A composition according to claim 1 in which the borate compound is tris(pentabromophenyl)borate.

3. A composition according to claim 1 in which the borate compound is tris(2,4,6-tribromophenyl)borate.

4. A composition according to claim 1 in which the borate compound is tris(pentachlorophenyl)borate.

5. A composition according to claim 1 in which the antimony compound is $Sb_2O_3$.

6. A self-extinguishing foam having improved dimensional stability comprising a normally flammable polyurethane resin in intimate admixture with from about 2 to about 5 percent based on the weight of the foam of an antimony compound selected from the oxide, chloride, bromide, iodide, oxychloride, and sulfide and an amount of a tris(polyhalophenyl)borate in which each polyhalophenyl group has from 3 to 5 halogen atoms selected from chlorine and bromine sufficient to provide about 3 to about 20 percent halogen in the foam.

7. The foam according to claim 6 in which the borate compound is tris(pentabromophenyl)borate.

8. The foam according to claim 6 in which the borate compound is tris(pentachlorophenyl)borate.

9. The foam according to claim 6 in which the borate compound is tris(2,4,6-tribromophenyl)borate.

10. A foam according to claim 6 in which the antimony compound is $Sb_2O_3$.

References Cited by the Examiner
UNITED STATES PATENTS 3,067,236  12/1962  Norton _____ 260—462
3,164,558  1/1965  Eichhorn _____ 260—2.5
3,189,565  6/1965  Woods et al. _____ 260—2.5

LEON J. BERCOVITZ, *Primary Examiner.*

DONALD E. CZAJA, *Examiner.*